(12) United States Patent  (10) Patent No.: US 8,886,567 B2
Nakagawa  (45) Date of Patent: Nov. 11, 2014

(54) IMAGE PROCESSING APPARATUS, IMAGE FORMING APPARATUS, AND COMPUTER-READABLE RECORDING MEDIUM STORING IMAGE PROCESSING PROGRAM

(75) Inventor: Kazuya Nakagawa, Nara (JP)

(73) Assignee: Kyocera Mita Corporation, Osaka-shi (JP)

( * ) Notice: Subject to any disclaimer, the term of this patent is extended or adjusted under 35 U.S.C. 154(b) by 1543 days.

(21) Appl. No.: 12/329,237

(22) Filed: Dec. 5, 2008

(65) Prior Publication Data

US 2009/0147989 A1 Jun. 11, 2009

(30) Foreign Application Priority Data

Dec. 6, 2007 (JP) .................. 2007-315521
Dec. 6, 2007 (JP) .................. 2007-315571
Dec. 6, 2007 (JP) .................. 2007-315572
Dec. 6, 2007 (JP) .................. 2007-315573

(51) Int. Cl.
G06Q 99/00 (2006.01)
H04N 1/387 (2006.01)
H04N 1/00 (2006.01)

(52) U.S. Cl.
CPC ......... *H04N 1/3872* (2013.01); *G06Q 2220/16* (2013.01); *H04N 1/00867* (2013.01); *H04N 1/0087* (2013.01); *H04N 1/00883* (2013.01)
USPC .............................. 705/57; 358/2.1; 358/3.28

(58) Field of Classification Search
USPC ..................... 705/57; 358/2.1, 3.28
See application file for complete search history.

(56) References Cited

U.S. PATENT DOCUMENTS

| | | | |
|---|---|---|---|
| 6,983,057 B1* | 1/2006 | Ho et al. | 382/100 |
| 7,933,054 B2* | 4/2011 | Fujioka | 358/540 |
| 2003/0210803 A1* | 11/2003 | Kaneda et al. | 382/100 |
| 2006/0187475 A1* | 8/2006 | Fujioka | 358/1.9 |
| 2007/0127771 A1* | 6/2007 | Kaneda et al. | 382/100 |
| 2008/0309984 A1* | 12/2008 | Minami et al. | 358/301 |

FOREIGN PATENT DOCUMENTS

| | | |
|---|---|---|
| CN | 1949818 A | 4/2007 |
| JP | 2001157032 | 6/2001 |
| JP | 2003-101762 | 4/2003 |
| JP | 200687042 | 3/2006 |

* cited by examiner

*Primary Examiner* — James D Nigh
(74) *Attorney, Agent, or Firm* — Gerald E. Hespos; Michael J. Porco; Matthew T. Hespos

(57) ABSTRACT

A picture image extracting section extracts a picture image from an image shown by image data stored in an image memory. A document image creating section executes a processing of superimposing a special dot pattern and a pattern image onto the image from which the picture image is extracted. After that, the picture image is put over the image to which the special dot pattern is superimposed, so that an image is created.

9 Claims, 16 Drawing Sheets

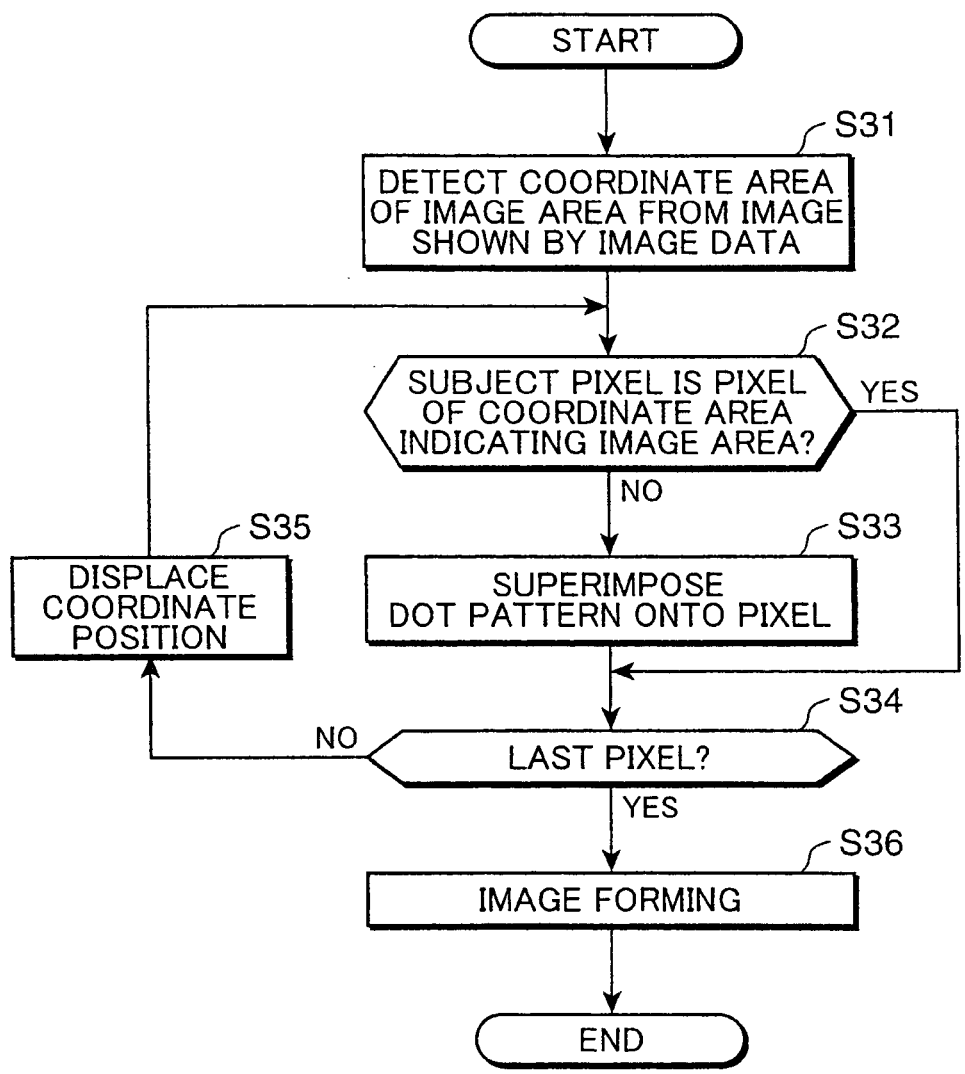

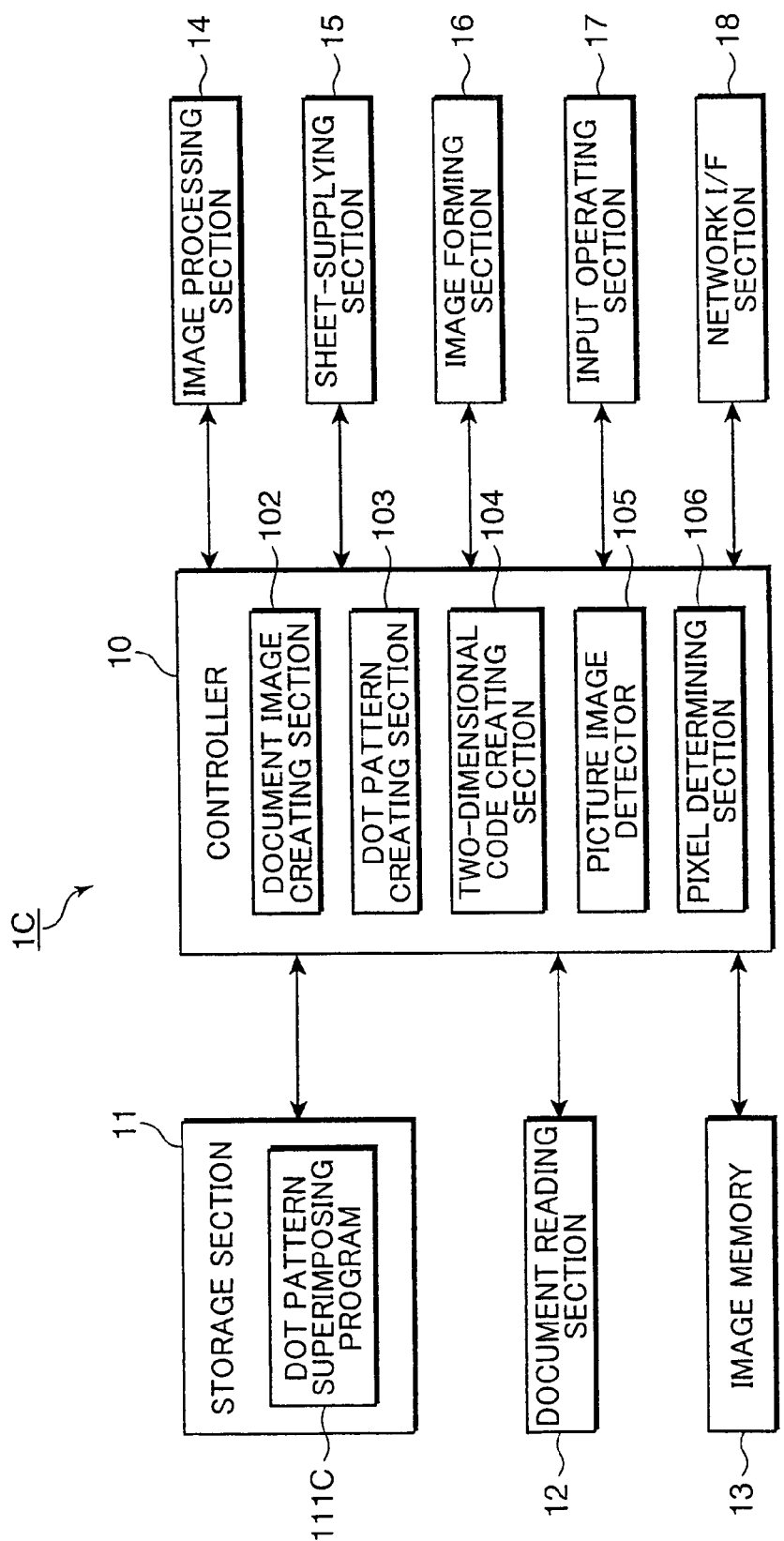

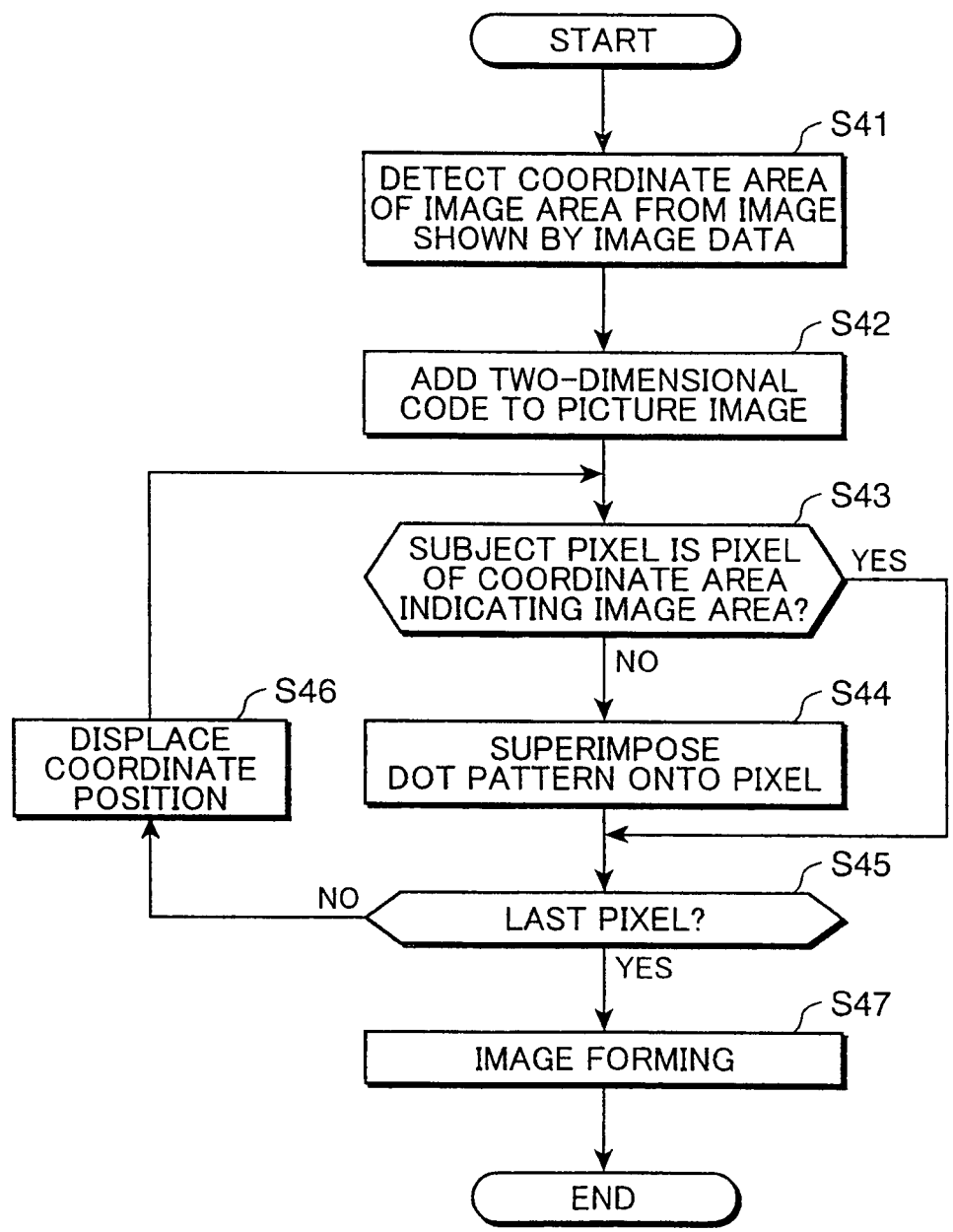

IMAGE PROCESSING APPARATUS, IMAGE FORMING APPARATUS, AND COMPUTER-READABLE RECORDING MEDIUM STORING IMAGE PROCESSING PROGRAM

BACKGROUND OF THE INVENTION

1. Field of the Invention

The present invention relates to an image processing apparatus, an image forming apparatus, and a computer-readable recording medium storing an image processing program, which create a document image by superimposing a special dot pattern or a pattern image, which includes predetermined information, onto an image shown by inputted image data.

2. Description of the Related Art

In recent years, there has been known a method for managing a document by printing a special dot pattern, which includes document creating information, copy information, or information for preventing copying of a document, together with a document image (refer to Japanese Unexamined Patent Publication No. 2003-101762). Also, there has been know a method for preventing unfair copying and distinguishing an original from a copy by printing a pattern image, in which warning characters appear if a document is copied with a copying machine, together with a document image.

However, in a case where a document image includes picture images such as a photo and an image, if the special dot pattern and the pattern image are superimposed onto a whole document image, an image quality of a printed picture image is degraded.

SUMMARY OF THE INVENTION

The present invention was made to solve the problem described above, and its object is to superimpose a special dot pattern and a pattern image for preventing copying without degrading an image quality of a picture image.

In summary, the present invention includes an image processing apparatus comprising: a watermark pattern creating section which creates a watermark pattern; an extracting section which extracts a picture image from an image shown by inputted image data; a superimposing section which executes a processing of superimposing the watermark pattern onto the image from which the picture image is extracted; and a document image creating section which creates a document image by putting the extracted picture image over the image onto which the watermark pattern is superimposed.

These and other objects, features and advantages of the present invention will become more apparent upon reading of the following detailed description along with the accompanied drawings.

BRIEF DESCRIPTION OF THE DRAWINGS

FIG. 11 is a flowchart showing a flow of a dot pattern superimposing processing in accordance with the third embodiment.

FIG. 13 is a block diagram showing an electric configuration of an image forming apparatus in accordance with the fourth embodiment of the present invention.

FIG. 15 is a flowchart showing a flow of a dot pattern superimposing processing in accordance with the fourth embodiment.

DETAILED DESCRIPTION OF THE PREFERRED EMBODIMENTS

Hereinafter, an image processing apparatus, an image forming apparatus, and an image processing program in accordance with a first embodiment of the present invention will be described.

It should be understood that image forming apparatuses in accordance with embodiments of the present invention which will be described herebelow include image processing apparatuses in accordance with the embodiments of the present invention. As the image forming apparatuses in accordance with the embodiments of the present invention, copying machines will be described as examples. It should be understood that, other than copying machines, the image forming apparatuses in accordance with the embodiments of the present invention may be complex machines having functions of a copying machine, a scanner, a facsimile machine, a printer, and the like.

Figure 1:
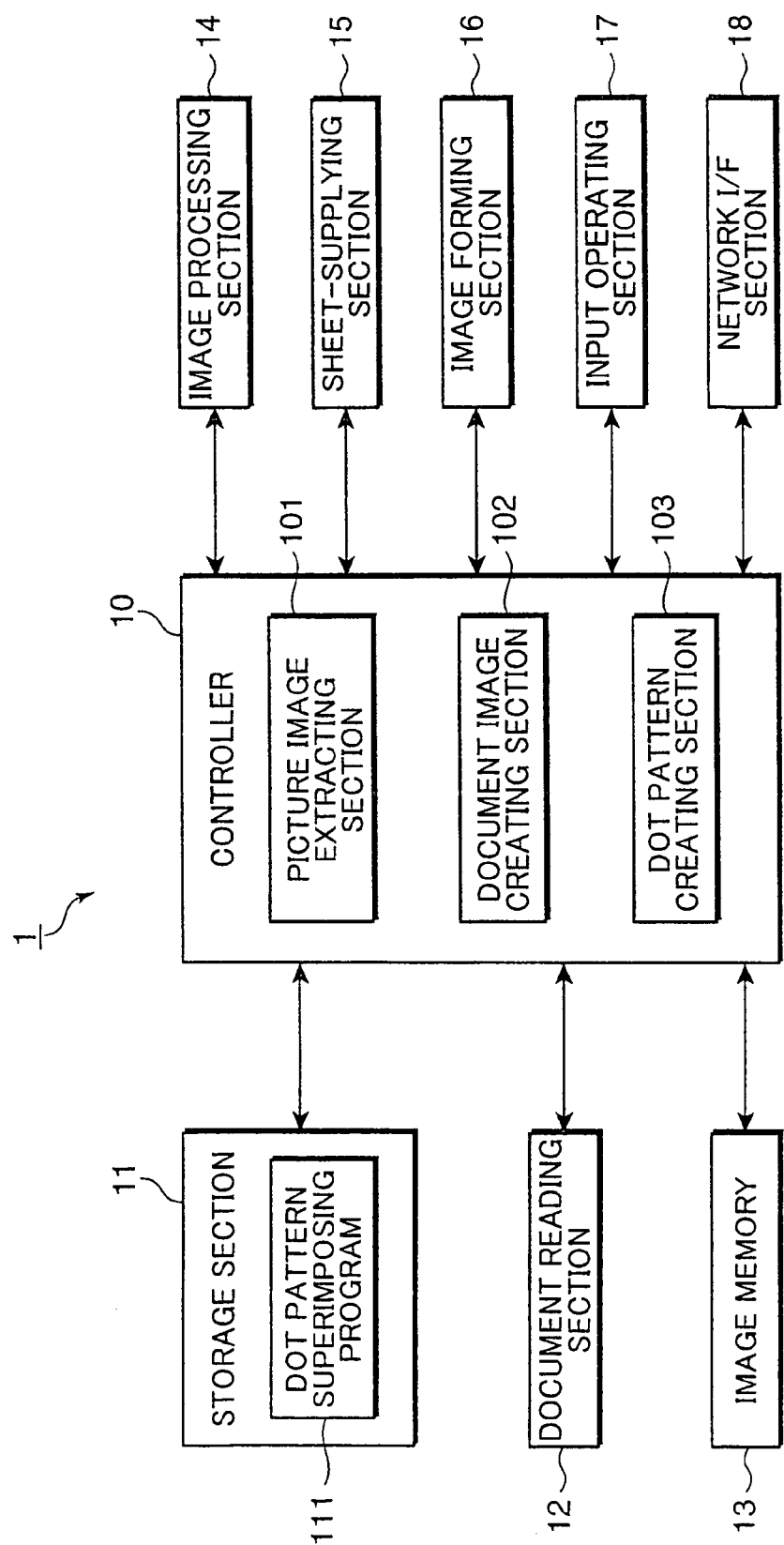
FIG. 1 is a block diagram showing an electric configuration of an image forming apparatus in accordance with a first embodiment of the present invention.

FIG. 1 is a function block diagram showing an electric configuration of an image forming apparatus 1 in accordance with a first embodiment. The image forming apparatus 1 includes a controller 10, a storage section 11, a document reading section 12, an image memory 13, an image processing section 14, a sheet-supplying section 15, an image forming section 16, an input operating section 17, and a network I/F section 18.

The controller 10 is configured by a CPU (Central Processing Unit) or the like. The controller 10 reads a program, which is stored in the storage section 11, in accordance with an inputted instruction signal and the like to execute a processing and performs an output of an instruction signal, data transfer, and the like to respective functional sections so as to integrally control the complex machine 1. Further, the controller 10 includes a picture image extracting section (which serves as an extracting section according to claims) 101, a document image creating section (which serves as a superimposing section and a document image creating section according to claims) 102, and a dot pattern creating section (which serves as a watermark pattern creating section according to claims) 103.

It should be understood that in the description herebelow, a coordinate area of a picture image indicates a coordinate including an area taken up by a picture image on an image. Further, the watermark pattern according to claims may be a pattern embedded with predetermined certain information or may be a pattern image, and it is a pattern whose object is to prevent unfair copying of a printed object and protect a copyright. Specifically, the pattern embedded with certain information includes a dot pattern, a grid pattern and a check pattern, and as long as it is a dot pattern, the dot pattern creating section 103 creates a special dot pattern by changing sizes and arrangement directions of dots in accordance with contents of information subjected to be embedded. Then, the document image creating section 102 creates a document image by superimposing the created pattern and a document image subjected to be embedded with information with each other. The information embedded into the pattern can be restored by reading the pattern with an apparatus which is capable of decoding the information.

The picture image extracting section 101 extracts a picture image from an image shown by image data stored in the image memory 13. Specifically, the picture image extracting section 101 extracts and takes out only a picture image from an image shown by image data stored in the image memory 13 and creates an image from which a picture image is removed from the image shown by the image data stored in the image memory 13. As a method for extracting a picture image, for example, in block image data constituted by m×n pixels as a part of interested image area (M×N pixel area), a difference value between a maximum pixel value and a minimum pixel value is calculated. In a case where the difference value is equal to or less than a predetermined threshold value, the interested image area is determined as a photo image area. In a case where the difference value is greater than the predetermined threshold value, the average pixel value of each of the block image data constituting the interested image area and the difference value between the maximum value and minimum value of each average pixel value are further calculated. In a case where the difference value is equal to or less than the predetermined threshold value, the interested image area is determined as a halftone dot image area. In a case where the difference value is greater than the predetermined threshold value, the interested image area is determined as a character image area. The photo image area and halftone dot image area determined in such a manner as described above is designated as the image area. An example of the method for detecting a picture image is disclosed in Japanese Patent Unexamined Publication No. H1-224884.

The document image creating section 102 executes a processing for superimposing a special dot pattern including certain information onto an image which is created by the picture image extracting section 101 and from which the picture image is removed. Further, the document image creating section 102 creates a document image by putting the extracted image over. It should be understood that "the image from which the picture image is extracted" according to claims and the embodiment indicates an image from which the picture image is removed.

As a method for superimposing the special dot pattern onto an image which is created by the picture image extracting section 101 and from which the picture image is removed, for example, in the case of a monochromatic image, the document image creating section 102 designates an image constituted by each pixel having a pixel value, which is calculated by executing an arithmetic calculation of a logical multiplication (AND) regarding a value of each pixel constituting an image created by the picture image extracting section 101 and an image from which the picture image is removed and a value of each pixel constituting a special dot pattern created by the dot pattern creating section 103, as the superimposed image. It should be understood that an example of the method for superimposing is disclosed in Japanese Patent Unexamined Publication No. 2003-101762.

The dot pattern creating section 103 creates a special dot pattern including printing information, such as user name and individual identification numbers of a user who performed printing (image forming) with the image forming apparatus, serial numbers of the image forming apparatus 1, and a printed date. A printed object on which the special dot pattern is printed is read by a predetermined external device (a device which is capable of reading the special dot pattern) and analyzed, so that, for example, a user who performed printing and an image forming apparatus can be specified. Accordingly, an information leakage due to unintentional printing and unfair copying can be prevented.

Herein, a flow between extraction of a picture image to superimposing of a special dot pattern will be described specifically with reference to FIG. 2. For example, image data corresponding to an image 2a is stored in the image memory 13. The image 2a includes photos or halftone dot images such as an image 21 and an image 22. The picture image extracting section 101 extracts (takes out) the image 21 and the image 22 from the image 2a to create an image 2b. Then, the document image creating section 102 executes a processing for superimposing the special dot pattern, which is created by the dot pattern creating section 103, onto the image 2b as a whole to create an image 2c. Next, the document image creating section 102 puts the image 21 and the image 22 over the image 2c, onto which the special dot pattern is superimposed, at positions where the image 21 and the image 22 were originally arranged. Then, an image 2d is created as a document image.

The storage section 11 stores a program and data for realizing various functions of the image forming apparatus 1. In the present embodiment, the storage section 11 stores a dot pattern superimposing program 111 (an image processing program in accordance with the first embodiment of the present invention). The dot pattern superimposing program 111 is a program which is operative to allow the controller 10 to execute an operation of extracting a picture image from the image shown by image data, superimposing a special dot pattern onto the image from which the picture image is extracted, and putting the extracted picture image over, so as to create a document image. In other words, the controller 10 operates in accordance with the dot pattern superimposing program 111 so as to serve as the picture image extracting section 101, the document image creating section 102, and the dot pattern creating section 103.

It should be understood that the controller 10 is not limited to have a configuration of serving as the picture image extracting section 101, the document image creating section 102, and the dot pattern creating section 103 in accordance with the dot pattern superimposing program 111, and it may be provided with the picture image extracting section 101, the document image creating section 102, and the dot pattern creating section 103, which are respectively configured by circuits.

The document reading section 12 reads a document with an image sensor such as a CCD (Charge Coupled Device) sensor, a CMOS (Complementary Metal Oxide Semiconductor) sensor, or the like and converts the read image into image data.

The image memory 13 temporarily stores image data read by the document reading section 12 and image data sent from an external device through the network I/F section 18.

The image processing section 14 executes image processing such as image correction and enlargement/reduction with respect to image data stored in the image memory 13.

The sheet-supplying section 15 takes out recording sheets one after another from a sheet supplying cassette and conveys the sheets to the image forming section 16.

The image forming section 16 forms an image in accordance with image data outputted from the image memory 13 onto a recording sheet.

The input operating section 17 includes a display panel and operation buttons, and when operated by a user, the input operating section 17 outputs an operation signal to the controller 10.

The network I/F section 18 is configured by a communication module such as a LAN board and performs a transmission of various data with an external device through a network (not illustrated) connected to the network I/F section 18.

Figure 3:
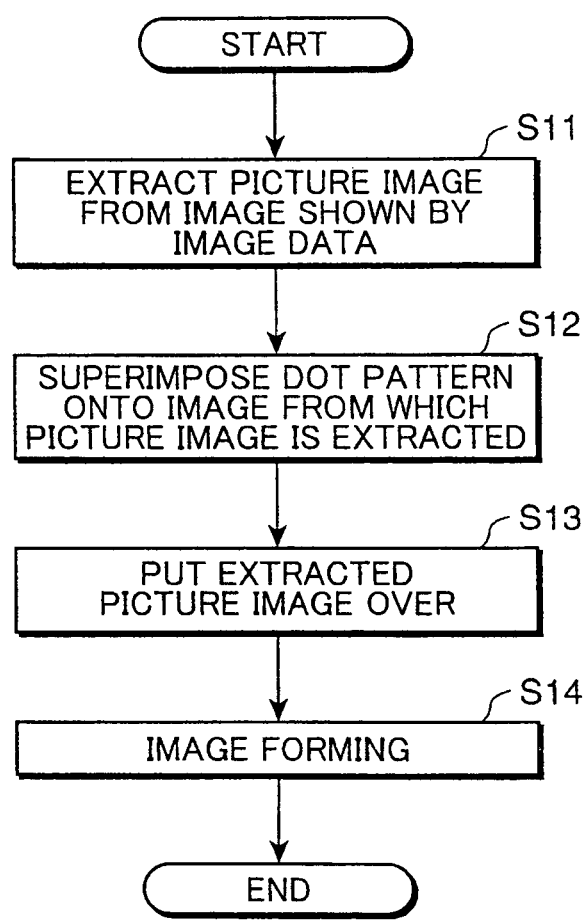
FIG. 3 is a flowchart showing a flow of a dot pattern superimposing processing.

FIG. 3 is a flowchart which shows a flow of a processing which is executed by the controller 10 of the image forming apparatus 1 in accordance with the first embodiment to superimpose the special dot pattern onto an image shown by image data.

Firstly, the picture image extracting section 101 extracts a picture image from an image shown by image data stored in the image memory 13 (step S11). Then, the document image creating section 102 executes a processing for superimposing the special dot pattern onto the image (corresponding to the image 2*b* of FIG. 2) from which the picture image is extracted (step S12; corresponding to the image 2*c* of FIG. 2), and further creates a document image by putting the picture image extracted in step S11 over (step S13; corresponding to the image 2*d* of FIG. 2). Then, the image forming section 16 prints the created document image onto a recording sheet (step S14).

As described above, in a case where the special dot pattern is superimposed onto the document image, the picture image is extracted, and the special dot pattern is superimposed onto the image from which the picture image is extracted, and thereafter the picture image is put over. Accordingly, the special dot pattern is not arranged on the picture image, so that image forming of embedding the special dot pattern can be performed without degrading an image quality of the picture image.

It should be understood that the present invention is not limited to the embodiment, and it can be modified in various ways. In the embodiment above, the image forming apparatus provided with the image processing apparatus in accordance with present invention is described. However, for example, a computer such as a personal computer may be provided with the image processing apparatus in accordance with the present invention. In other words, in a case where the user creates a document including a picture image with a personal computer, and after that the user performs an input operation of superimposing the special dot pattern onto the document and printing the same, a controller of the personal computer extracts a picture image from the created document and superimposes the special dot pattern onto the document from which the picture image is extracted. After that, the extracted picture image is put over to create a document image, and then the document image is sent to a printer. In this way, a document image can be created without arranging the special dot pattern onto the picture image.

Further, in the embodiment above, the special dot pattern is described as an example of the watermark pattern. However, certain information may be embedded to a grid pattern, a check pattern, or the like.

Further, as the watermark pattern, other than the patterns above, a pattern image which causes warning characters with respect to unfair copying to appear by copying may be superimposed. The pattern image includes, for example, a background image and a latent picture image. If a document on which the pattern image is printed is copied, the latent picture image appears prominently. For example, if warning characters are used as the latent picture image, actions such as unfair copying can be prevented.

Figure 4:
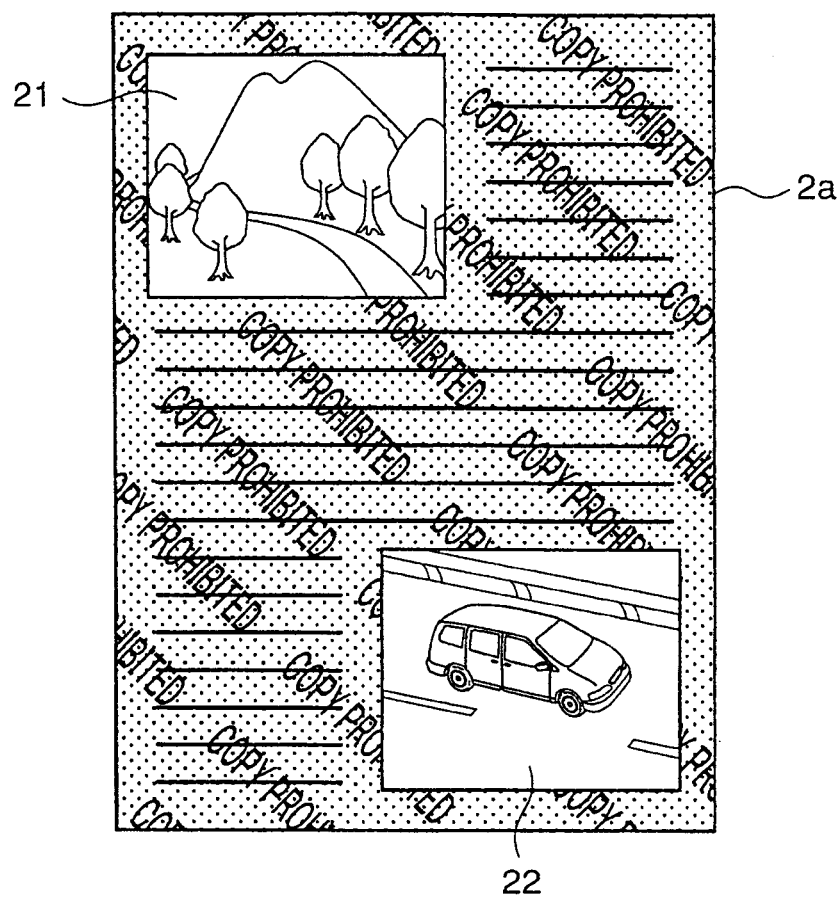
FIG. 4 shows an arrangement area of a pattern image.

FIG. 4 shows the case where the pattern image is superimposed onto an image from which the picture image is extracted, and after that the extracted picture image is put over. In this case, the controller 10 includes a pattern image creating section in place of the dot pattern creating section 103. The pattern image creating section creates a pattern image 3 in accordance with an instruction inputted by a user. Then, the document image creating section 102 executes a processing for superimposing the created pattern image with respect to the image from which the picture image is extracted by the picture image extracting section 101. After that, the extracted picture image is put over. In this way, unfair copying can be prevented without degrading image quality of the picture image.

Next, an image processing apparatus, an image forming apparatus, and an image processing program in accordance with a second embodiment of the present invention will be described. It should be understood that description regarding the configuration and processing which are the same as those of the first embodiment will be omitted.

Figure 5:
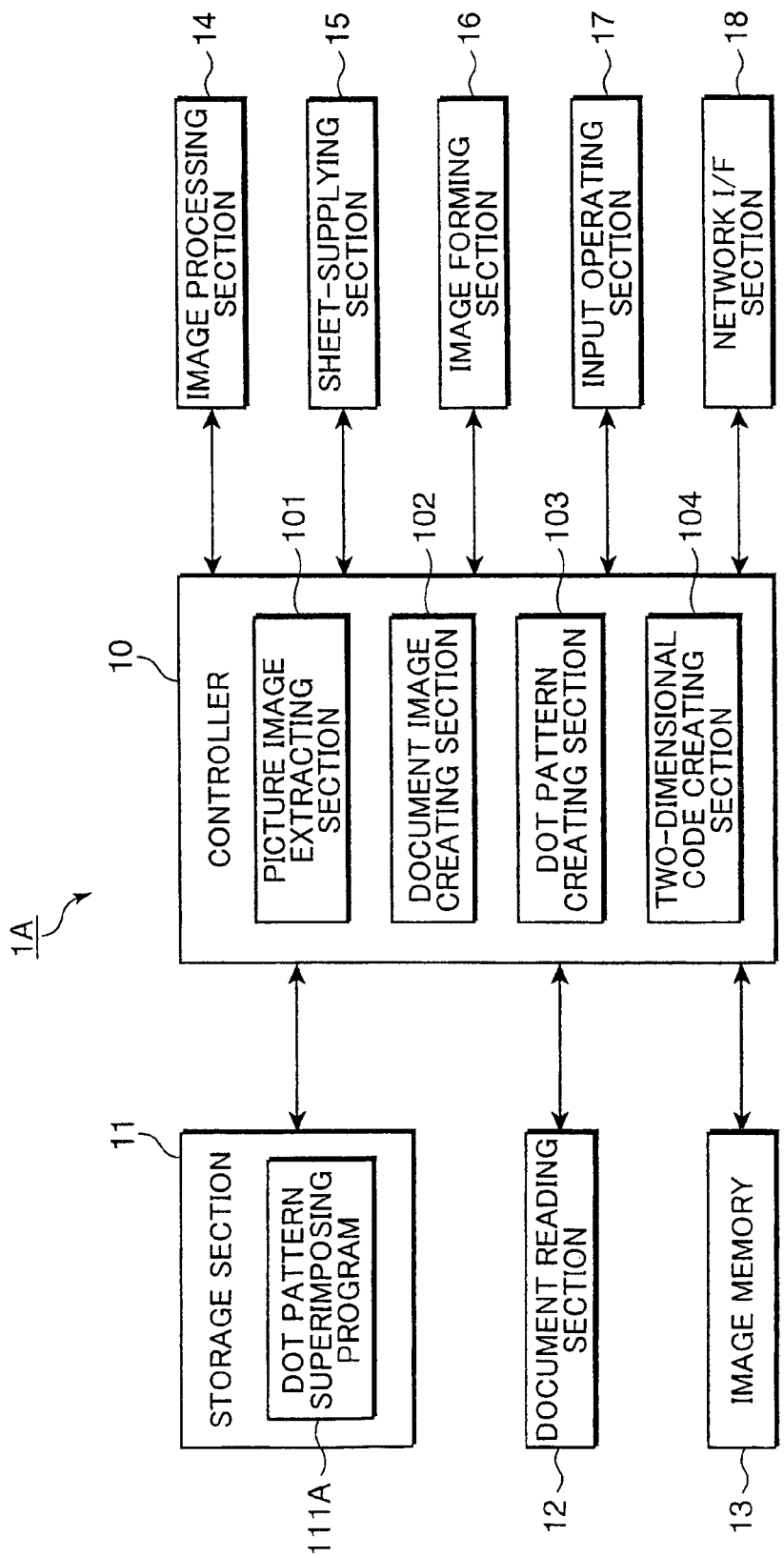
FIG. 5 is a block diagram showing an electric configuration of an image forming apparatus in accordance with a second embodiment of the present invention.

FIG. 5 is a function block diagram showing an electric configuration of an image forming apparatus 1A in accordance with the second embodiment of the present invention.

A controller 10 of the image forming apparatus 1A in accordance with the second embodiment includes a picture image extracting section (extracting section) 101, a document image creating section (superimposing section, document image creating section) 102, a dot pattern creating section (watermark pattern creating section) 103, and a two-dimensional code creating section 104.

The two-dimensional code creating section 104 creates a two-dimensional code which is to be embedded to a picture image extracted by the picture image extracting section 101. Herein, the two-dimensional code indicates an identification image which includes predetermined information for protecting, for example, a copyright of an image and serves to prevent actions such as unfair copying and modification of an image and proves original copy. It should be understood that one-dimensional barcode may be adopted in place of the two-dimensional code, as long as it is an identification image which does not prominently degrades or damages image quality of an image.

Figure 6:
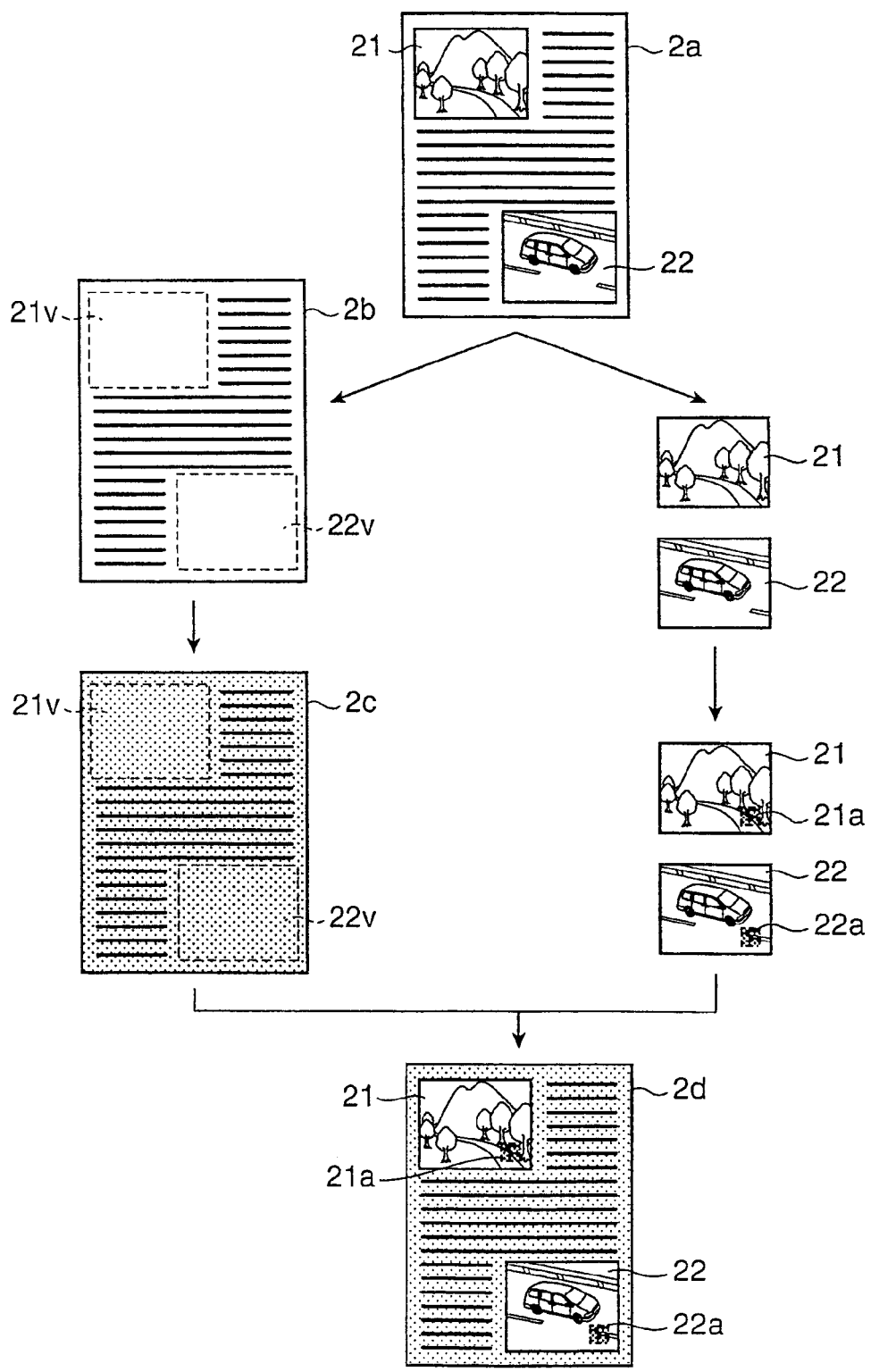
FIG. 6 shows extraction of a picture image and an arrangement area of a special dot pattern.

A flow between the extraction of the picture image and superimposing of the special dot pattern will be described specifically with reference to FIG. 6.

Figure 2:
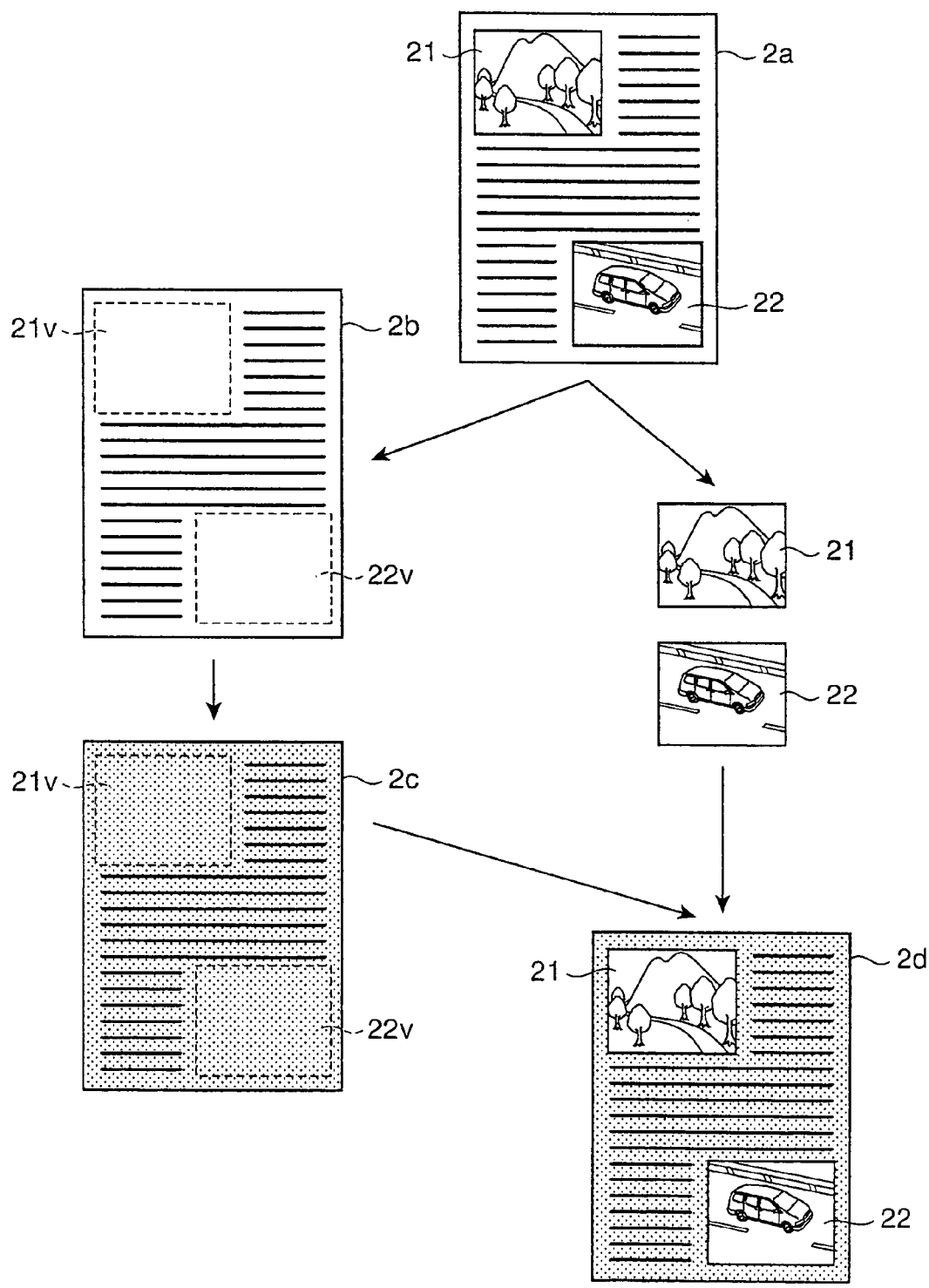
FIG. 2 shows extraction of a picture image and an arrangement of a special dot pattern.

Similarly to the first embodiment shown in FIG. 2, if the picture image extracting section 101 creates the image 2*b*, and the dot pattern creating section 103 creates the image 2*c*, the document image creating section 102 further adds the two-dimensional code 21*a* and the two-dimensional code 22*a*, which are created by the two-dimensional code creating section 104, to the image 21 and the image 22 respectively. Herein, the positions at which the two-dimensional codes are added can be set desirably by a user or automatically. In a case where the two-dimensional codes are added automatically, it is preferable that they are added in an area other than a central portion in the picture image (for example, lower end or the like). Then, the image 21 and the image 22, to which the two-dimensional codes are added respectively, are written over the image 2c, to which the special dot pattern is superimposed, so that the image 2d is created as a document image.

In the second embodiment, the storage section 11 stores a dot pattern superimposing program 111A (an image processing program in accordance with the second embodiment of the present invention). The dot pattern superimposing program 111A is a program which extracts a picture image from an image shown by image data, superimposes the special dot pattern onto the image from which the picture image is extracted, and further puts the picture image with the two-dimensional code over to create a document image. In other words, the controller 10 operates in accordance with the dot pattern superimposing program 111A to serve as the picture image extracting section 101, the document image creating section 102, the dot pattern creating section 103, and the two-dimensional code creating section 104.

However, the controller 10 is not limited to the configuration which serves as the picture image extracting section 101, the document image creating section 102, the dot pattern creating section 103, and the two-dimensional code creating section 104 in accordance with the dot pattern superimposing program 111A, and it may be provided with the picture image extracting section 101, the document image creating section 102, the dot pattern creating section 103, and the two-dimensional code creating section 104, which are configured by circuits.

Figure 7:
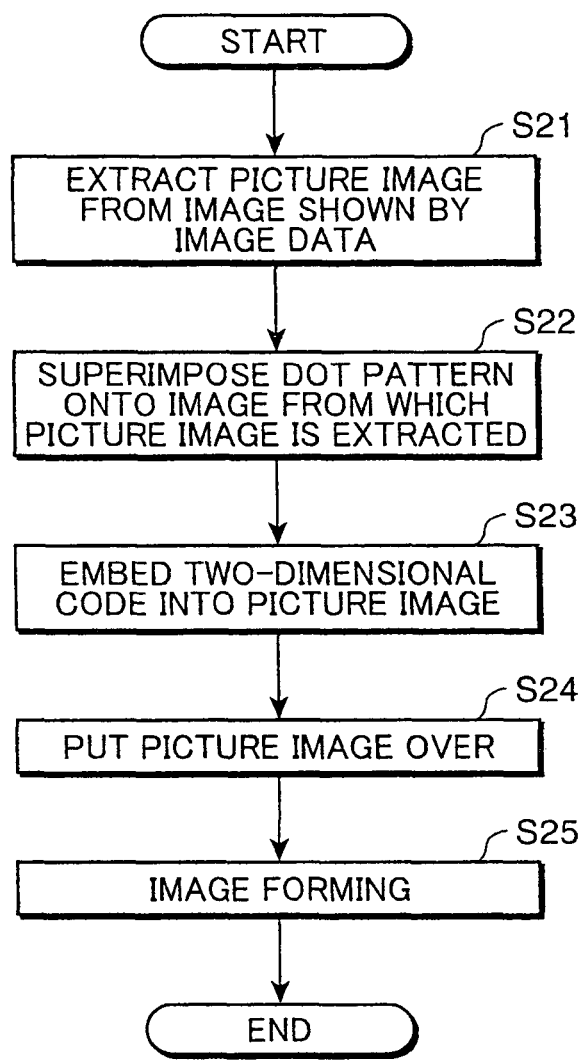
FIG. 7 is a flowchart showing a flow of a dot pattern superimposing processing in accordance with the second embodiment.

FIG. 7 is a flowchart which shows a flow of a processing which is executed by the controller 10 of the image forming apparatus 1A in accordance with the second embodiment to superimpose the special dot pattern onto the image shown by the image data. Description regarding the processing which is similar to that executed by the controller 10 of the image forming apparatus 1 in accordance with the first embodiment will be omitted.

When the picture image extracting section 101 extracts the picture image from the image shown by image data stored in the image memory 13 (step S21), and the document image creating section 102 executes a processing for superimposing the special dot pattern onto the image (corresponding to the image 2b of FIG. 6) from which the picture image is extracted (step S12; corresponding to the image 2c of FIG. 6), the two-dimensional codes created by the two-dimensional code creating section 104 are added to the picture image extracted by the picture image extracting section 101 (step S23). Then, with respect to the image to which the special dot pattern is superimposed in step S22, the document image creating section 102 puts the picture image over to which the two-dimensional codes are added, so that the document image is created (step S24; corresponding to the image 2d of FIG. 6). Then, the image forming section 16 prints the created document image onto a recording sheet (step S25).

As described above, according to the image forming apparatus 1A in accordance with the second embodiment, an image to which the special dot pattern is embedded can be formed without degrading an image quality of the picture image, and additionally the two-dimensional code including predetermined information is added to the picture image, so that actions such as unfair copying and modification of an image can be prevented.

The present invention is not limited to the configuration of the embodiment, and it may be modified in various manners. In the second embodiment, the image forming apparatus provided with the image processing apparatus in accordance with the embodiment of the present invention is described above. However, for example, a computer such as a personal computer may be provided with the image processing apparatus in accordance with the embodiment of the present invention. In other words, in a case where a user uses a personal computer to create a document including a picture image and thereafter performs an operation input of allowing a printer to perform a printing the special dot pattern onto the document, a controller in a personal computer extracts a picture image from the created document and superimposes the special dot pattern onto the document from which the picture image is extracted. After that, the picture image, to which the two-dimensional code is added, is put over to so that a document image is created, and then the document image is sent to the printer. Accordingly, the document image can be created without arranging the special dot pattern on the picture image, and actions such as unfair copying and modification of the picture image can be prevented.

Figure 8:
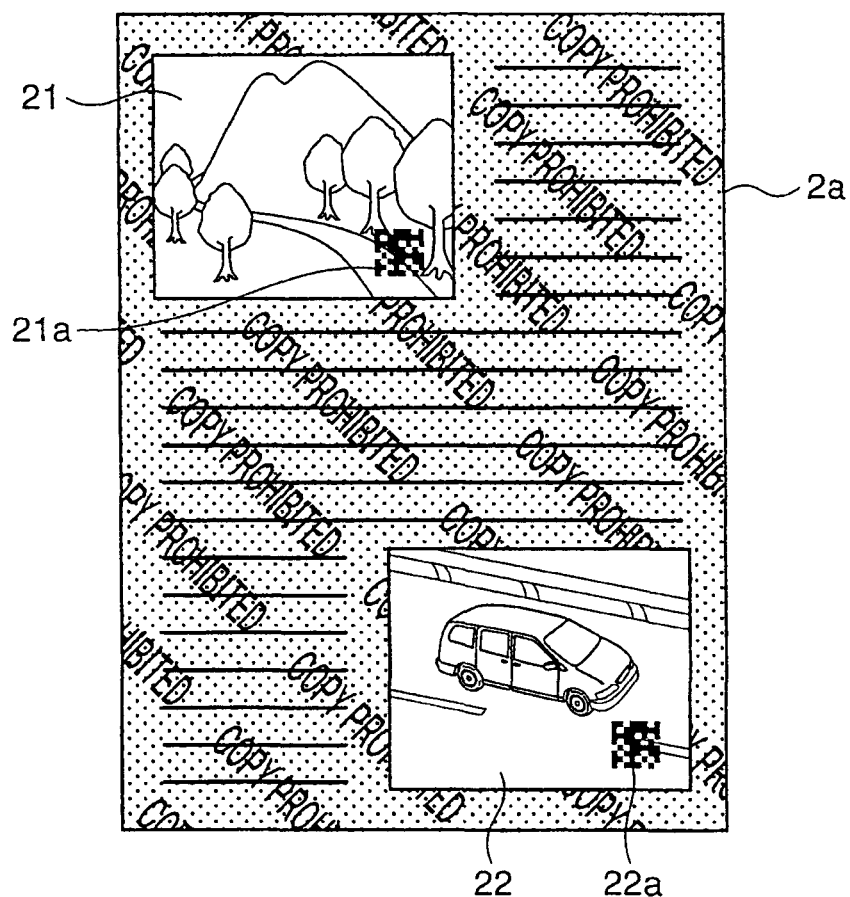
FIG. 8 shows an arrangement area of the pattern image.

Further, also in the second embodiment, the watermark pattern may be the one with a grid pattern or a check pattern in which certain information is included, and the pattern image may be further superimposed thereto. FIG. 8 shows the case where the pattern image is superimposed onto the image from which the picture image is extracted and after that the extracted picture image is put over. In this case, similarly to the first embodiment, the controller 10 has a pattern image creating section in place of the dot pattern creating section 103.

Next, an image processing apparatus, an image forming apparatus, and an image processing program in accordance with a third embodiment of the present invention will be described. It should be understood that description regarding the configuration and processing which are similar to those of the first and second embodiments will be omitted.

Figure 9:
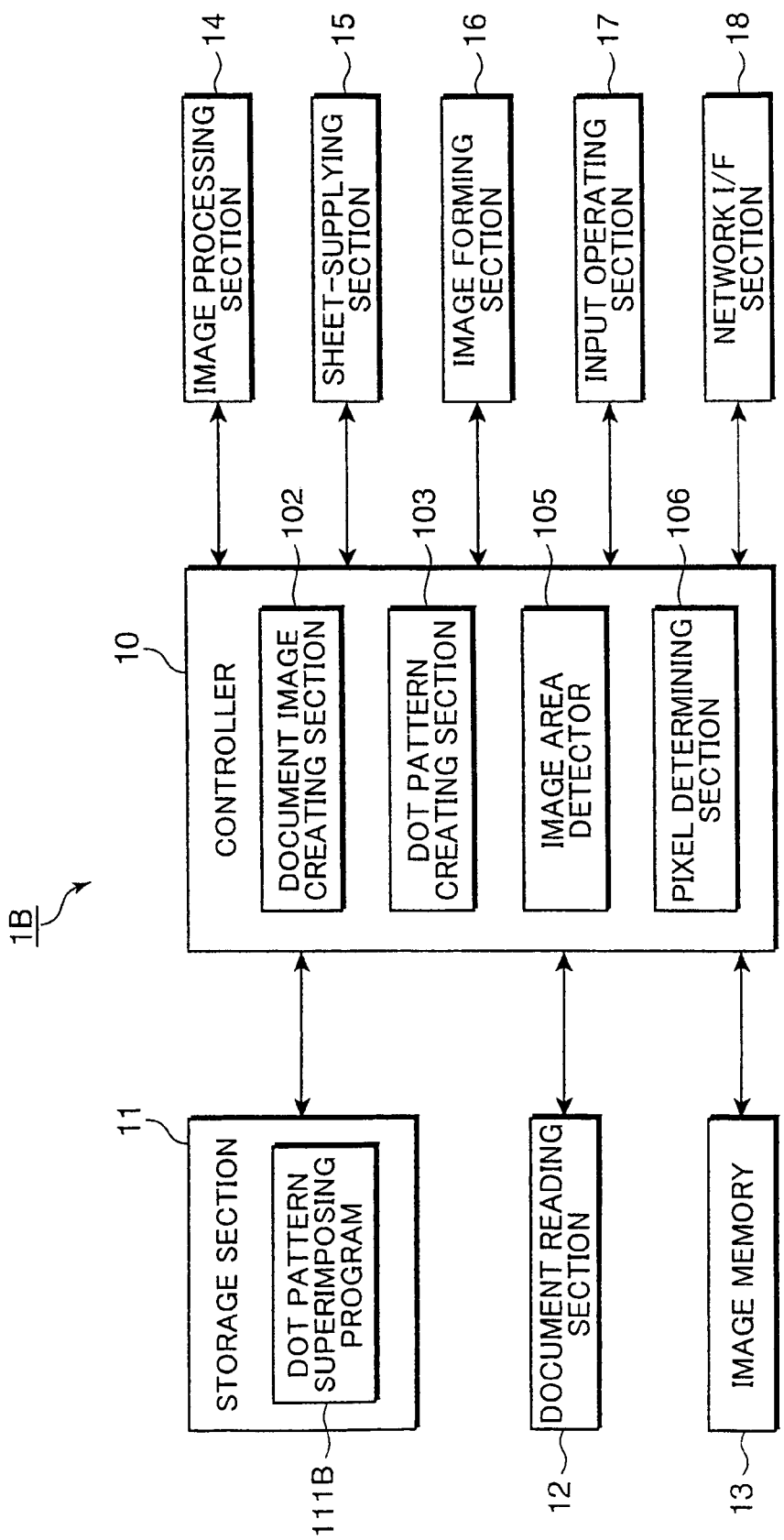
FIG. 9 is a block diagram showing an electric configuration of an image forming apparatus in accordance with the third embodiment of the present invention.

FIG. 9 is a function block diagram showing an electric configuration of an image forming apparatus 1B in accordance with the third embodiment of the present invention.

A controller 10 of the image forming apparatus 1B in accordance with the third embodiment includes an image area detector (detecting section in claims) 105, a pixel determining section (determining section in claims) 106, a document image creating section (document image creating section in claims) 102, and a dot pattern creating section (watermark pattern creating section in claims) 103.

The image area detector 105 detects a coordinate area of a picture image from an image shown by image data stored in the image memory 13. Detailed description will be omitted since an example of a method for detecting an image area is disclosed in Japanese Patent Unexamined Publication No. H1-224884.

The pixel determining section 106 sequentially determines on the whole image whether or not a predetermined number of pixels constituting an image (hereinafter, referred to as "subject pixel") are pixels within the coordinate area detected by the image area detector 105 in accordance with a predetermined coordinate value on the image. In other words, the pixel determining section 106 determines whether or not the subject pixels are the pixels constituting the picture image.

When it is determined that the subject pixels are not the pixels which are present within the coordinate area, the document image creating section 102 in accordance with the third embodiment executes a processing for superimposing the special dot pattern, which is created by the dot pattern creating section 103, onto the subject pixels to create a document image. Since an example of the method of superimposing the special dot pattern onto the subject pixels to create a document image is disclosed in Japanese Patent Unexamined Publication No. 2003-101762, detailed description will be omitted.

Figure 10A:
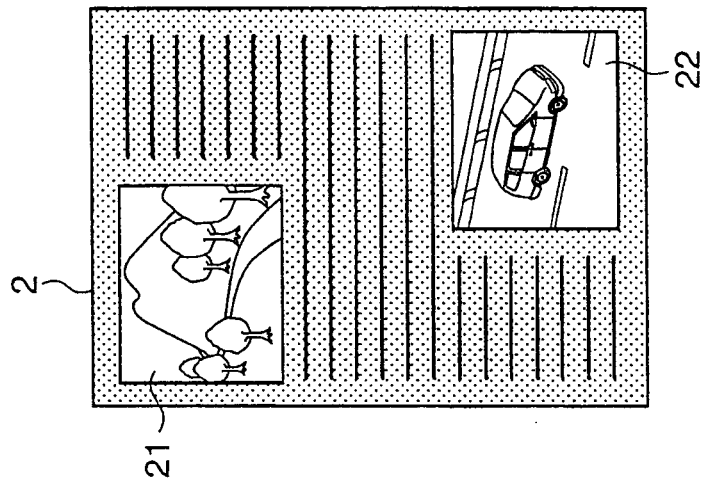
FIG. 10 shows detection of an image area and superimposing of the special dot pattern.
Figure 10B:
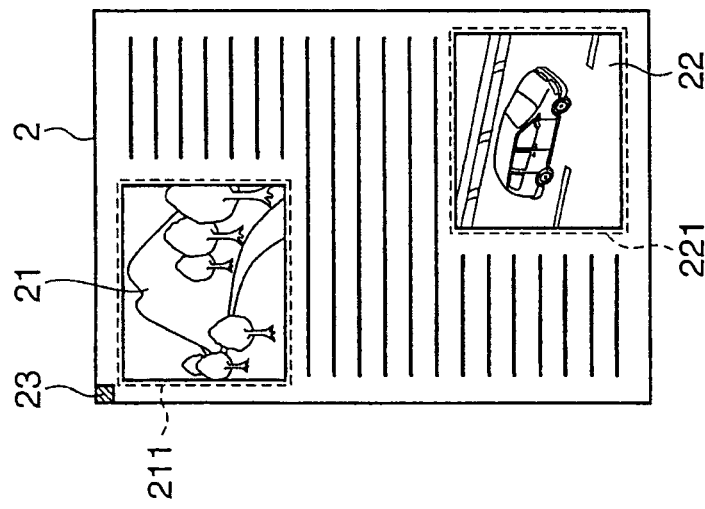

A flow of the processing executed by each functional section of the controller 10 in accordance with the third embodiment will be described specifically with reference to FIG. 10. For example, an image 2 like the one shown in FIG. 10A is stored in the image memory 13. The image 2 includes photos or halftone dot images like the image 21 and the image 22. In this case, as shown in FIG. 10B, the image area detector 105 detects an area 211 as a coordinate area of the image 21 and detects an area 221 as a coordinate area of the image 22.

Then, the pixel determining section 106 determines whether or not the subject pixel 23 is a pixel which is present within the coordinate area of the area 211 or the area 221. In a case where the subject pixel 23 is not a pixel within the coordinate area, the document image creating section 102 superimposes the special dot pattern, which is generated by the dot pattern creating section 103, onto the subject pixel 23. In a case where the subject pixel 23 is a pixel which is present within the coordinate area, since the subject pixel 23 is a pixel constituting the image 21 or 22, the superimposing of the special dot pattern is not performed.

Figure 10C:
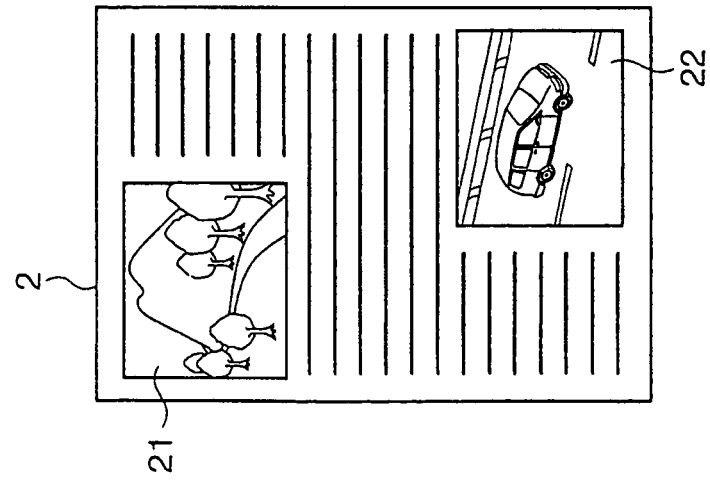

In such manner, the pixel determining section 106 sequentially displaces the coordinate value from, for example, an upper left of the image 2 to determine on the whole pixels of the image 2. FIG. 10C shows the image 2 after the determination on whole pixels is executed. Specifically, in the processing according to the third embodiment, it is determined whether the subject pixels are pixels which are present within the coordinate area of the picture image. In a case where the subject pixels are not pixels within the coordinate area of the picture image, the special dot pattern is superimposed onto the subject pixels, so that a document image can be created without superimposing the special dot pattern onto the image.

In the third embodiment, the storage section 11 stores a dot pattern superimposing program 111B (a third embodiment of an image processing program in accordance with the present invention). The dot pattern superimposing program 111B is a program which detects an image area from an image shown by image data and superimposes the special dot pattern onto an area other than the image area to create a document image. In other words, the controller 10 operates in accordance with the dot pattern superimposing program 111B to serve as the picture image detector 105, the pixel determining section 106, the document image creating section 102, and the dot pattern creating section 103.

However, the controller 10 is not limited to the configuration to serve as the picture image detector 105, the pixel determining section 106, the document image creating section 102, and the dot pattern creating section 103 in accordance with the dot pattern superimposing program 111B, and it may be the one provided with the picture image detector 105, the pixel determining section 106, the document image creating section 102, and the dot pattern creating section 103, which are configured by circuits.

FIG. 11 is a flowchart showing a flow of the processing executed by the controller 10 of the image forming apparatus 1B in accordance with the third embodiment to superimpose the special dot pattern onto the image. Description regarding the processing which is similar to that of the first or second embodiment will be omitted.

Firstly, the image area detector 105 detects coordinate areas of a picture image from the image shown by image data stored in the image memory 13 (step S31; corresponding to FIG. 10B). Then, the pixel determining section 106 determines whether or not the subject pixels are pixels which are present within the coordinate area of the picture image (step S32). In a case where the pixels are within the coordinate area (step S32; YES), the controller 10 proceeds to the processing of step S34. In a case where the pixels are not within the coordinate area (step S32; NO), the document image creating section 102 executes the processing of superimposing the special dot pattern onto the subject pixels (step S33).

In a case where the subject pixels are not the pixels of the last coordinate values (step S34; NO), the pixel determining section 106 changes locations of the coordinate values one after another to the coordinate positions indicating new pixels (step S35), and the pixel determining section 106 executes a similar determination to the pixels of new coordinates as subject pixels (step S32). On the other hand, in a case where the subject pixels are pixels of the last coordinate value (step S34; YES), the image forming section 16 prints the created document image onto a recording sheet (step S36).

As described above, according to the third embodiment, in the case where the special dot pattern is superimposed onto the image, the special dot pattern is superimposed onto pixels which are out of the coordinate area of the picture image, so that the special dot pattern is not arranged on the picture image. Accordingly, the document image embedded with the special dot pattern can be created without degrading image quality of the picture image.

It should be understood that the present invention is not limited to the configuration of the embodiment, and it can be modified in various ways. In the third embodiment, the image forming apparatus provided with the image processing apparatus in accordance with the embodiment of the present invention is described. However, for example, a computer such as a personal computer may be provided with the image processing apparatus in accordance with the embodiment of the present invention.

Further, also in the third embodiment, the watermark pattern may be the one in which certain information is embedded in a grid pattern or a check pattern, and a pattern image may be superimposed. The case where the pattern image is superimposed onto the area other than the picture image to create a document image will be described with reference to FIG. 12.

Figure 12:
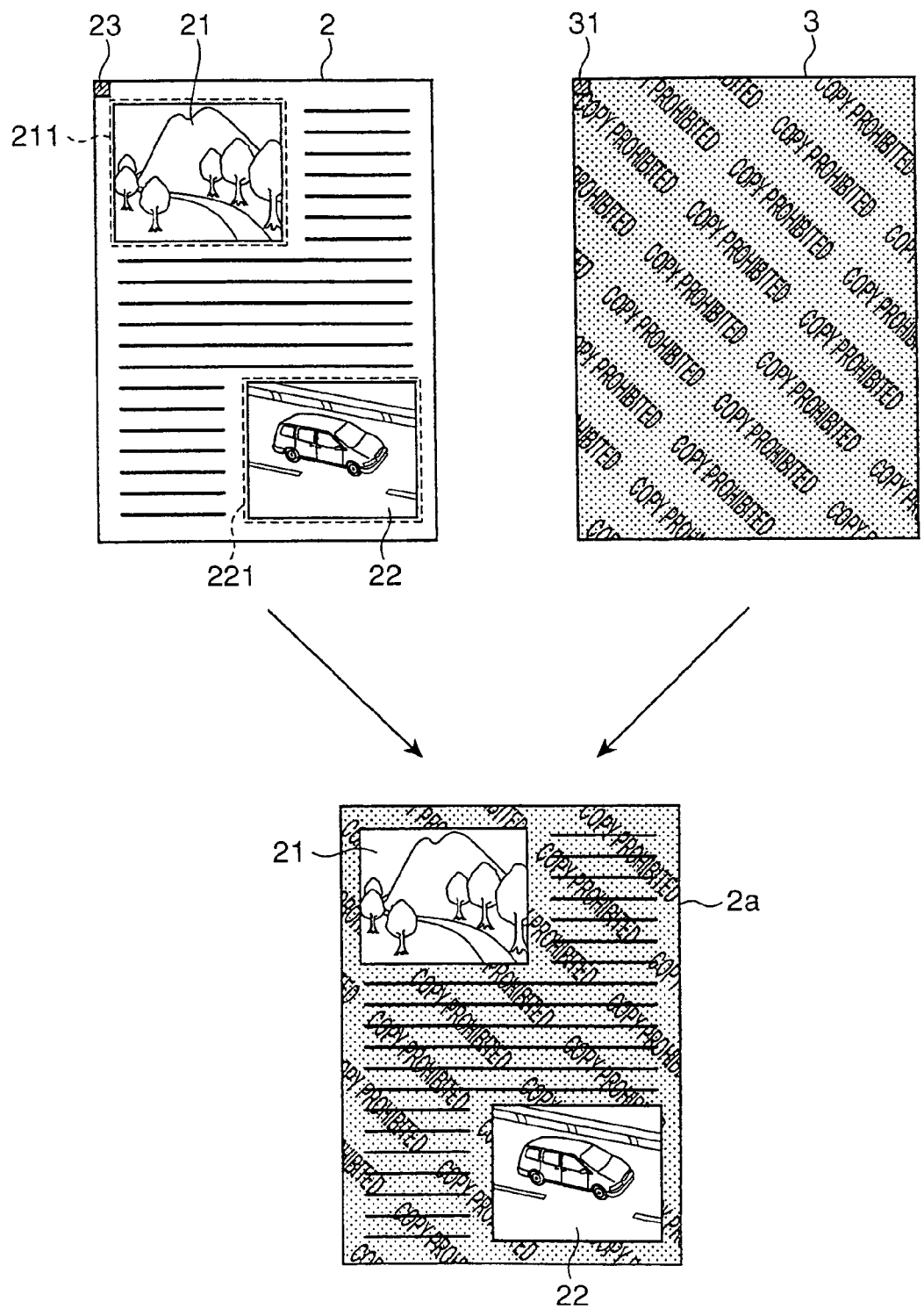
FIG. 12 shows superimposing of the pattern image.

Firstly, the controller 10 in accordance with the third embodiment includes a pattern image creating section in place of the dot pattern creating section 103. FIG. 12 shows that a pattern image 3 having the size which is the same as the image 2 is created. Then, the image area detector 105 detects a coordinate area of the picture image of the image 2. The pixel determining section 106 determines whether the subject pixel 23 is included in the coordinate area shown by the area 211 or the area 221. In the case where the subject pixel 23 is a pixel which is not present within the coordinate area, the document image creating section 102 executes the processing for superimposing the pattern image onto the subject pixel 23. In particular, the pixel 31 on the pattern image 3 which has the relatively same coordinate value with the subject pixel 23 and the same pixel number with the subject pixel 23 is superimposed onto the subject pixel 23 by the document image creating section 102.

In a case where the subject pixel 23 is a pixel within the coordinate area, the subject pixel 23 is a pixel which constitutes the image 21 or 22. Accordingly, the pattern image is not superimposed onto the subject pixel 23. A document image which can be acquired after repeating this processing on the whole image 2 is an image 2a. As described above, by superimposing the pattern image only to the pixel outside the coordinate area of the picture image, unfair copying of the document can be suppressed without degrading image quality of the picture image.

Next, an image processing apparatus, an image forming apparatus, and an image processing program in accordance with a fourth embodiment of the present invention will be described. It should be understood that description regarding the configuration and processing similar to those of the first through third embodiments will be omitted.

FIG. 13 is a function block diagram showing an electric configuration of an image forming apparatus 1C in accordance with the fourth embodiment of the present invention.

The controller 10 of the image forming apparatus 1C in accordance with the fourth embodiment includes an image area detector (detecting section in claims) 105, a pixel determining section (determining section in claims) 106, a document image creating section (a adding section, a document image creating section in claims) 102, a dot pattern creating section (watermark pattern creating section in claims) 103, and a two-dimensional code creating section 104.

The two-dimensional code creating section 104 creates a two-dimensional code which is to be embedded into a picture image included in a coordinate area detected by the image area detector 105. The two-dimensional code is similar to the two-dimensional code in accordance with the second embodiment.

Figure 14A:
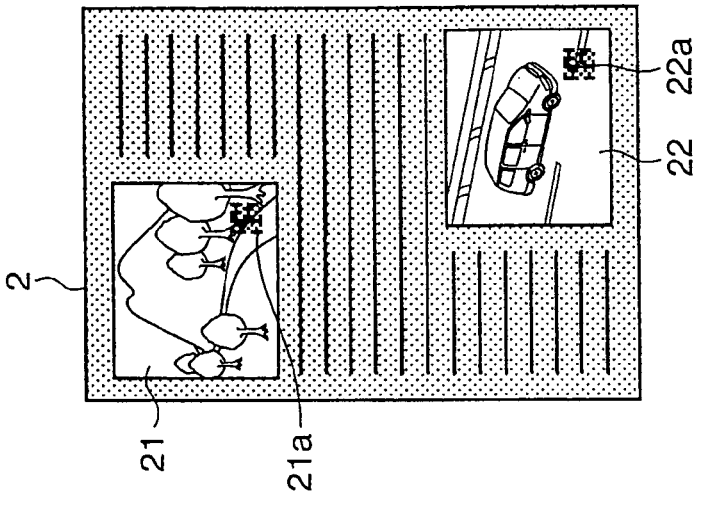
FIG. 14 shows detection of an image area and superimposing of the special dot pattern.
Figure 14B:
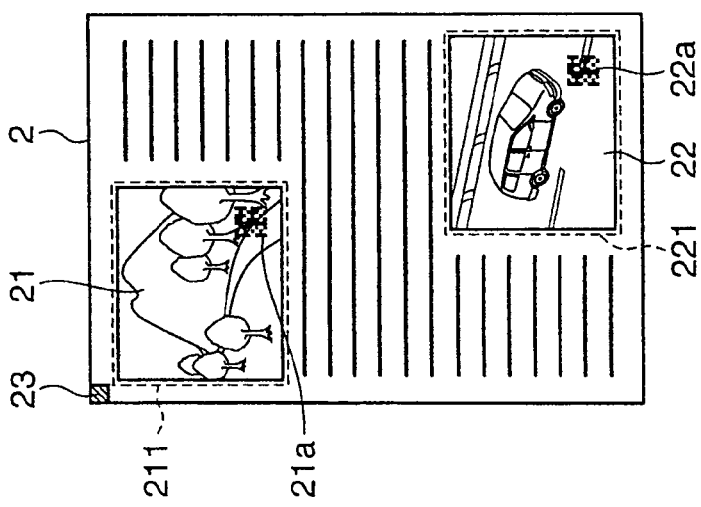

A flow of the processing executed by each functional section of the controller 10 in accordance with the fourth embodiment will be described specifically with reference to FIG. 14. For example, an image 2 like the one shown in FIG. 14A is stored in the image memory 13. The image 2 includes photos and halftone dot images like the image 21 and the image 22. In this case, as shown in FIG. 14B, the image area detector 105 detects the area 211 as the coordinate area of the image 21 and detects the area 221 as the coordinate range of the image 22.

Then, the document image creating section 102 adds the two-dimensional codes 21a and 22a which are created by the two-dimensional code creating section 104 to the images 21 and 22 respectively. Herein, the positions at which the two-dimensional codes are added can be arbitrarily set by a user or may be added automatically. In the case where the two-dimensional codes are added automatically, it is preferable that the two-dimensional code is added in an area other than central portion in the picture image (for example, lower end or the like).

Next, the pixel determining section 106 determines whether or not a subject pixel 23 is a pixel which is present within the coordinate area of the area 211 or the area 221. In the case where the subject pixel 23 is not a pixel which is present within the coordinate area, the document image creating section 102 superimposes the special dot pattern created by the dot pattern creating section 103 onto the subject pixel 23. In the case where the subject pixel 23 is a pixel which is present within the coordinate area, the subject pixel 23 is a pixel which constitutes the image 21 or 22. Accordingly, superimposing of the special dot pattern is not performed by the document image creating section 102.

Figure 14C:
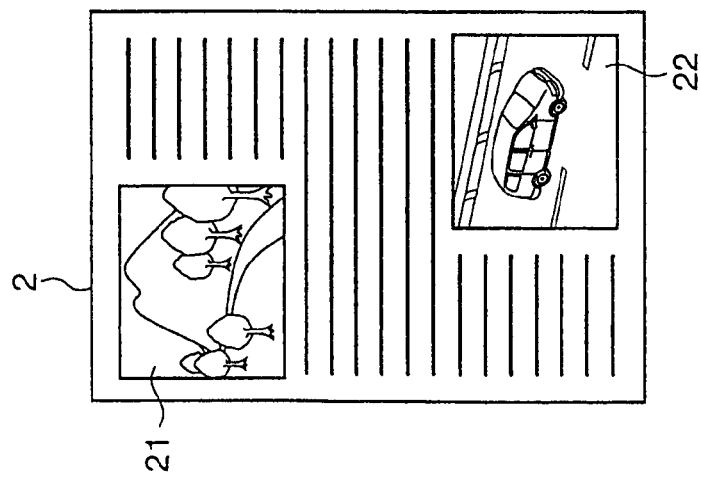

As described above, the pixel determining section 106 displaces the coordinate values from, for example, an upper left coordinate of the image 2 sequentially, so as to perform determination on whole pixels of the image 2. FIG. 14C shows the image 2 after the determination on whole pixels is completed. In other words, it is determined whether or not the subject pixel is a pixel within the coordinate area of the picture image, and if the pixel is not within the coordinate area of the picture image, the special dot pattern is superimposed onto the subject pixel, thus a document image is created without superimposing the special dot pattern onto the image.

In the fourth embodiment, the storage section 11 stores a dot pattern superimposing program 111C (an image processing program in accordance with the fourth embodiment of the present invention). The dot pattern superimposing program 111C is a program which detects an image area from an image shown by image data and superimposes the special dot pattern onto areas other than the image area, and further adds a two-dimensional code to the picture image, so as to create a document image. In other words, the controller 10 operates in accordance with the dot pattern superimposing program 111C to serve as the picture image detector 105, the pixel determining section 106, the document image creating section 102, the dot pattern creating section 103, and the two-dimensional code creating section 104.

It should be understood that the controller 10 is not limited to the configuration of serving as the picture image detector 105, the pixel determining section 106, the document image creating section 102, the dot pattern creating section 103, and the two-dimensional code creating section 104 in accordance with the dot pattern superimposing program 111C, and it may be provided with the picture image detector 105, the pixel determining section 106, the document image creating section 102, the dot pattern creating section 103, and the two-dimensional code creating section 104, all of which are configured by circuits respectively.

FIG. 15 is a flowchart which shows a flow of the processing which is executed by the controller 10 of the image forming apparatus 1C in accordance with the fourth embodiment to superimpose the special dot pattern onto the image shown by the image data. Description regarding the processing which are the same as those of the first through third embodiments will be omitted.

When the image area detector 105 detects a coordinate area of a picture image from an image shown by image data stored in the image memory 13 (step S41; corresponding to FIG. 16B), the document image creating section 102 adds a two-dimensional code onto a picture image included in the detected coordinate area (step S42).

Next, when the pixel determining section 106 determines that the subject pixel is a pixel within the coordinate area of the picture image (step S43;YES), the controller 10 allows the processing to proceed to step S45. When the subject pixel is not a pixel which is present within the coordinate area (step S43; NO), the document image creating section 102 executes the processing of superimposing the special dot pattern onto the subject pixel (step S44).

In the case where the subject pixel is not a pixel of the last coordinate value (step S45;NO), the pixel determining section 106 changes the coordinate value by one value to a coordinate position indicating a new pixel (step S46), and the pixel determining section 106 executes the similar determination to a pixel of a changed new coordinate as a subject pixel (step S43). On the other hand, in the case where the subject pixel is a pixel of the last coordinate value (step S45; YES), the image forming section 16 prints a created document image onto a recording sheet (step S47).

As described above, according to the fourth embodiment, a document image embedded with the special dot pattern can be created without degrading image quality of a picture image. Further, adding the two-dimensional code including predetermined information to the picture image can prevent unfair copying of an image.

It should be understood that the present invention is not limited to the configuration of the embodiment, and it can be modified in various ways. In the fourth embodiment, the image forming apparatus provided with the image processing apparatus in accordance with the embodiment of the present invention. However, for example, a computer such as a personal computer may be provided with the image processing apparatus in accordance with the embodiment of the present invention.

Further, also in the fourth embodiment, the watermark pattern may be the one in which certain information is embedded into the grid pattern or the check pattern, or the pattern image may be superimposed. The case where a document image is created by superimposing the pattern image onto the areas other than the picture image will be described with reference to FIG. 16.

Figure 16:
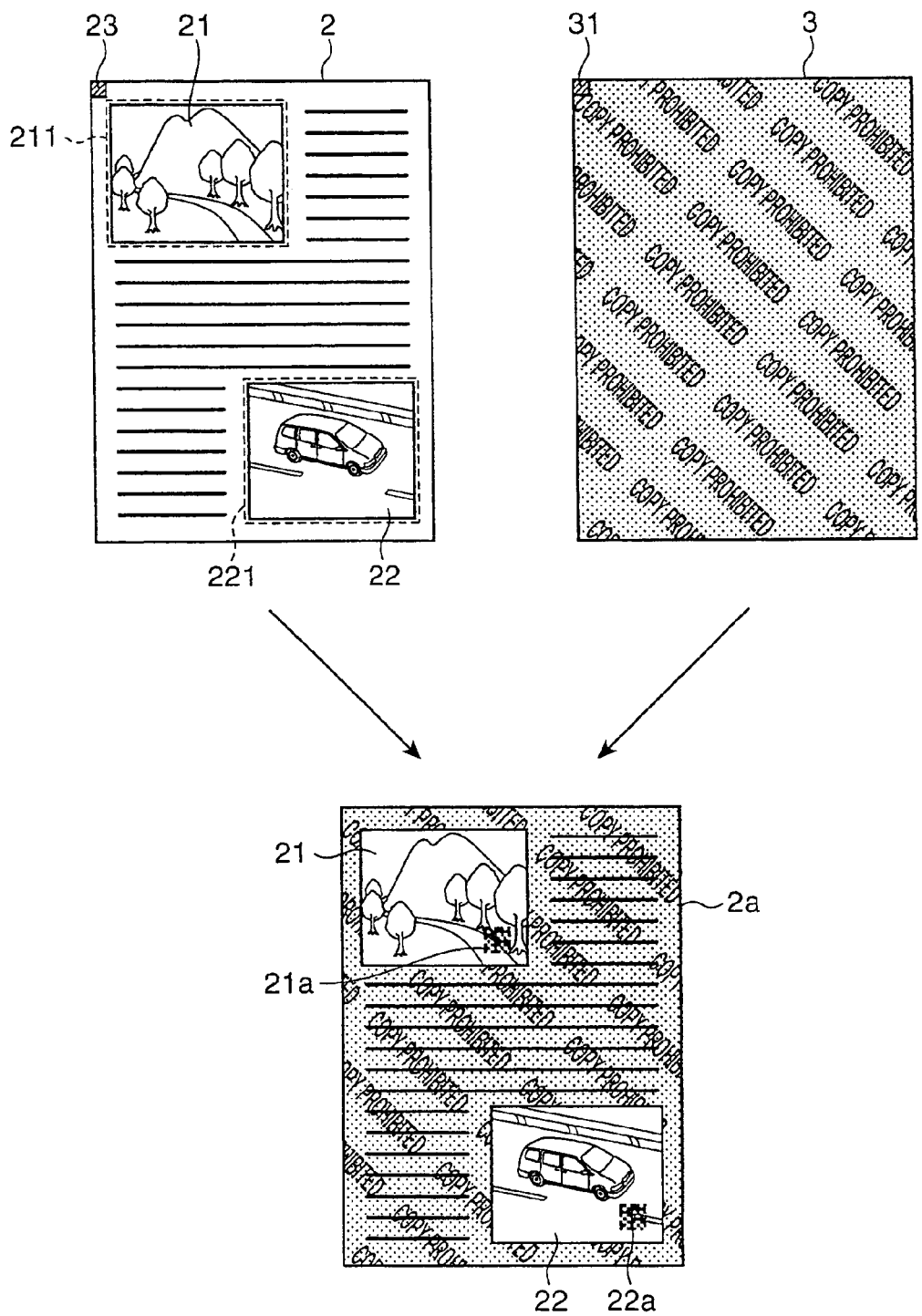
FIG. 16 shows superimposing of the pattern image.

Firstly, the controller 10 includes a pattern image creating section in place of the dot pattern creating section 103. In FIG. 16, the pattern image 3 having a size which is the same as the image 2 is depicted. Then, the image area detector 105 detects a coordinate area of the picture image of the image 2, and the document image creating section 102 adds the two-dimensional codes 21*a* and 22*a* respectively to the image 21 and the image 22 included in the detected coordinate areas. The pixel determining section 106 determines whether or not the subject pixel 23 is included in the coordinate area indicated by the area 211 or the area 221. In a case where the subject pixel 23 is not a pixel within the coordinate area, the document image creating section 102 executes the processing for superimposing the pattern image onto the subject pixel 23. In particular, a pixel 31 on the pattern image 3, which has a coordinate value relatively the same as the subject pixel 23 and the number of pixels which is the same as the subject pixel 23, is superimposed onto the subject pixel 23.

In the case where the subject pixel 23 is a pixel within the coordinate area, the subject pixel 23 is a pixel which constitutes the image 21 or 22. Accordingly, the pattern image is not superimposed onto the subject pixel 23. The document image which can be acquired after repeating the processing to the whole image 2 is the image 2*a*. As described above, by superimposing the pattern image only to the pixels outside the coordinate area of the picture image, unfair copying of a document can be prevented without degrading image quality of a picture image.

In summary, according to an aspect of the present invention, an image processing apparatus includes: a watermark pattern creating section which creates a watermark pattern; an extracting section which extracts a picture image from an image shown by inputted image data; a superimposing section which executes a processing of superimposing the watermark pattern onto the image from which the picture image is extracted; and a document image creating section which creates a document image by putting the extracted picture image over the image onto which the watermark pattern is superimposed.

(1) According to this invention, the watermark pattern such as the special dot pattern is not arranged on the picture image. Accordingly, the watermark pattern can be embedded to an inputted image without degrading an image quality of the picture image.

(2) Further, according to an aspect of the present invention, the watermark pattern is a pattern into which certain information is embedded.

(3) Further, according to an aspect of the present invention, the watermark pattern is a pattern image.

(4) Further, according to an aspect of the present invention, the image processing apparatus further includes: an adding section which adds a predetermined identification image onto the extracted picture image, and the document image creating section creates a document image by putting the picture image, onto which the identification image is added by the adding section, over the image onto which the watermark pattern is superimposed by the superimposing section.

According to this invention, the watermark pattern such as a dot pattern is not arranged on the picture image. Accordingly, the watermark pattern can be embedded into an inputted image without degrading an image quality of the picture image. Further, by adding the identification image to the picture image, actions such as unfair copying and modification of an image can be prevented.

(5) Further, according to an aspect of the present invention, the identification image includes a code image.

According to this invention, by using a code image (for example, one-dimensional barcode, two-dimensional code) as an identification image, information can be included in a manner less likely to degrade or break an image quality of a picture image than superimposing the special dot pattern or the watermark pattern of a pattern image to the picture image.

(6) Further, according to an aspect of the present invention, an image forming apparatus includes: the image processing apparatus in accordance with the present invention; and an image forming section which forms a document image, which is created by the document image creating section, on a recording medium.

(7) Further, according to an aspect of the present invention, an image forming apparatus includes: a watermark pattern creating section which creates a watermark pattern; a detector which detects a coordinate area of a picture image from an image shown by inputted image data; a determining section which sequentially determines on the whole image whether or not a pixel constituting the image shown by the inputted image data is present within the detected coordinate area; and a document image creating section which creates a document image by executing a processing of superimposing the watermark pattern onto the pixels when the determining section determines that the pixel is not present within the detected coordinate area.

Further, according to an aspect of the present invention, an image forming apparatus comprising: the image processing apparatus of the statement above; and an image forming section which forms a document image created by the document image creating section onto a recording medium.

According to the invention, the watermark pattern such as the special dot pattern is not arranged on the picture image. Accordingly, a document image embedded with the watermark pattern can be created without degrading an image quality of the picture image.

(10) Further, according to an aspect of the present invention, the image processing apparatus further includes: an adding section which adds an identification image including information to a picture image which is included in the coordinate area detected by the detector.

According to the invention, the watermark pattern such as the special dot pattern is not arranged on the picture image. Accordingly, a document image embedded with the watermark pattern can be created without degrading an image quality of the picture image. Further, by adding the identification image to the picture image, actions such as unfair copying and modification of an image can be prevented.

(13) Further, according to another aspect of the present invention, a computer-readable recording medium stores an image processing program, and the image processing program allows a computer to serve as: a watermark pattern creating section which creates a watermark pattern; an extracting section which extracts a picture image from an image shown by inputted image data; a superimposing section which executes a processing of superimposing the watermark pattern onto the image from which the picture image is extracted; and a document image creating section which creates a document image by putting the extracted picture image over the image onto which the watermark pattern is superimposed.

(14) Further, according to the present invention, the computer-readable recording medium stores the image processing program, and the image processing program further allows the computer to serve as: an adding section which adds a predetermined identification image to the extracted picture image, and the document image creating section creates a document image by writing the picture image, onto which the identification image is added by the adding section, over the image onto which the watermark pattern is superimposed by the superimposing section.

(15) Further, according to the present invention, the computer-readable recording medium stores the image processing program, and the image processing program further allows the computer to serve as: a watermark pattern creating section which creates a watermark pattern; a detector which detects a coordinate area of a picture image from an image shown by inputted image data; a determining section which sequentially determines on the whole image whether or not a predetermined number of pixels constituting the image are pixels which are present within the detected coordinate area; and a document image creating section which creates a document image by executing a processing of superimposing the watermark pattern onto the pixels when the determining section determines that the pixels are not present within the detected coordinate area.

(16) Further, according to the present invention, the image processing program further allows the computer to serve as: an adding section which adds an identification image including information, to a picture image which is included in the coordinate area detected by the detector.

This application is based on Japanese Patent application serial Nos. 2007-315521, 2007-315571, 2007-315572, and 2007-315573 filed in Japan Patent Office on Dec. 6, 2007, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. An image processing apparatus for processing inputted image data defining a first image that includes a picture image and a portion that is not the picture image, the apparatus comprising:
    a watermark pattern creating means for creating a watermark pattern;
    a picture image extractor means for extracting the picture image from the first image shown by inputted image data and creating a second image that is a remaining image obtained by removing the picture image from the first image and including a position where the picture image had been arranged;
    a superimposing means for executing a processing of superimposing the watermark pattern onto the second image including the position where the picture image had been arranged to thereby define a third image; and
    a document image creating means for superimposing the extracted picture image over the third image in the position where the picture image had been arranged to thereby create a document image that includes the picture image onto which the watermark pattern is not superimposed and the portion that is not the picture image onto which the watermark pattern is superimposed.

2. The image processing apparatus according to claim 1, wherein the watermark pattern is a pattern into which certain information is embedded.

3. The image processing apparatus according to claim 1, wherein the watermark pattern is a pattern image.

4. The image processing apparatus according to claim 1, further comprising:
    an adding means for adding a predetermined identification image onto the extracted picture image, wherein
    the document image creating means further is configured for creating a document image by putting the picture image, onto which the identification image is added by the adding portion, over the image onto which the watermark pattern is superimposed by the superimposing portion.

5. The image processing apparatus according to claim 4, wherein the identification image includes at least one of one-dimensional data and two-dimensional data for preventing copying of the picture image.

6. An image forming apparatus, comprising:
    the image processing apparatus of claim 1; and
    an image forming means for forming a document image created by the document image creating means onto a recording medium.

7. The image processing apparatus according to claim 1, wherein the picture image is a photo image or a halftone dot image, and the portion that is not the picture image is a character image.

8. A nontransitory computer-readable recording medium which stores an image processing program comprising computer executable instructions for processing inputted image data defining a first image that includes a picture image and a portion that is not the picture image, the image processing program, when executed by a computer causes the computer to execute the steps of:
    creating a watermark pattern;
    extracting the picture image from the first image shown by inputted image data and creating a second image that is a remaining image obtained by removing the picture image from the first image and including a position where the picture image had been arranged;
    superimposing the watermark pattern onto an entirety of the second image including the position where the picture image had been arranged to thereby define a third image; and
    superimposing the extracted picture image over the third image in the position where the picture image had been arranged and thereby creating a document image that includes the picture image onto which the watermark pattern is not superimposed and the portion that is not the picture image onto which the watermark pattern is superimposed.

9. The computer-readable recording medium which stores the image processing program of claim 8, wherein the image processing program further causes the computer to execute the steps of:
    adding a predetermined identification image to the extracted picture image, and
    creating a document image by putting the picture image, onto which the identification image is added over the image onto which the watermark pattern is superimposed.

* * * * *